Feb. 9, 1960 C. B. SPASE 2,924,083
SPEED TORQUE METERING ARRANGEMENT WITH THERMAL
CONTROL, THERMAL UNIT THEREFOR AND
METHOD OF MAKING SAID UNIT
Filed May 13, 1958 3 Sheets-Sheet 2
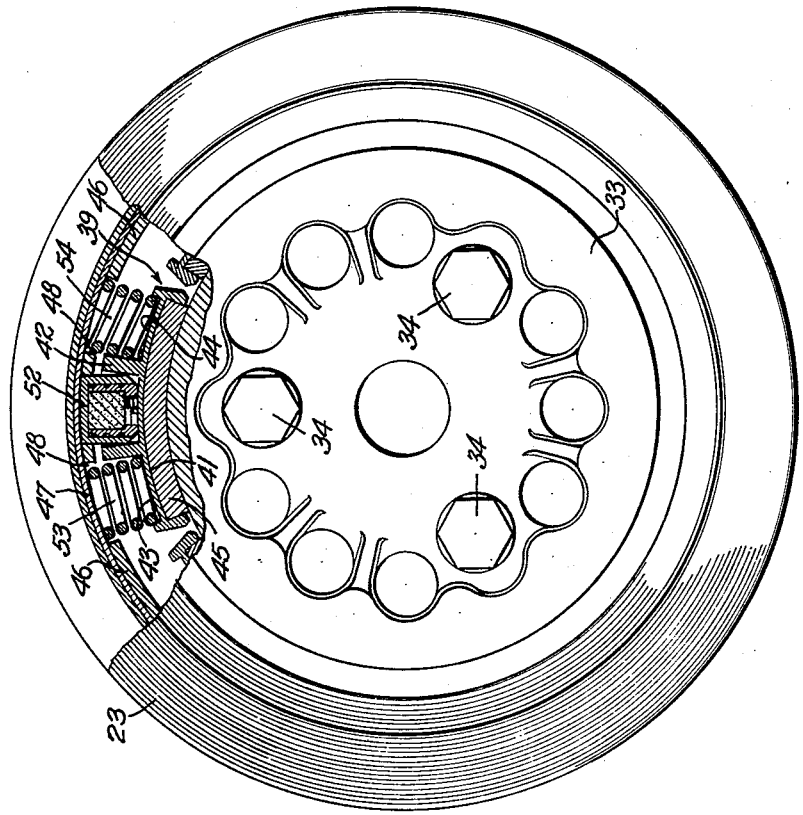
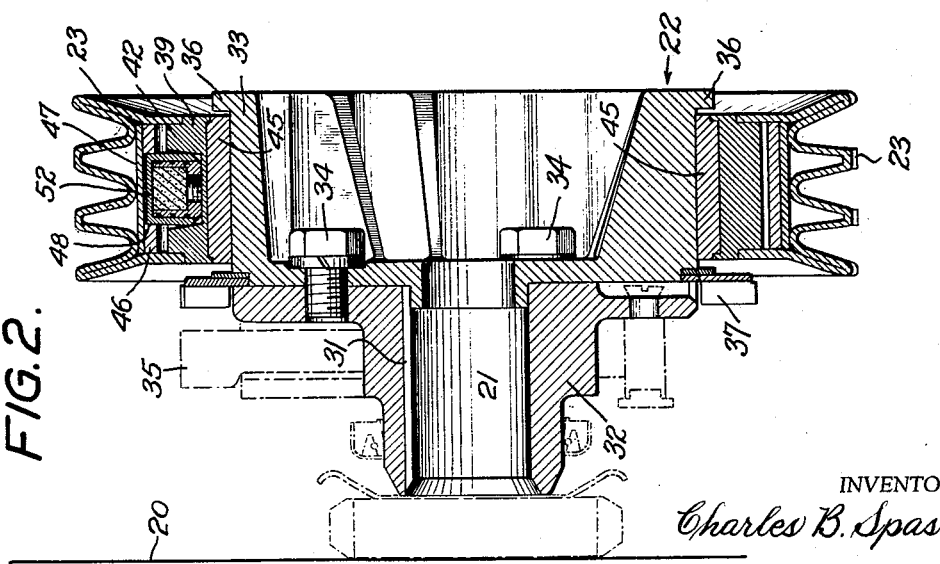
INVENTOR
Charles B. Spase,
BY Karl W. Flocks
ATTORNEY United States Patent Office 2,924,083
Patented Feb. 9, 1960

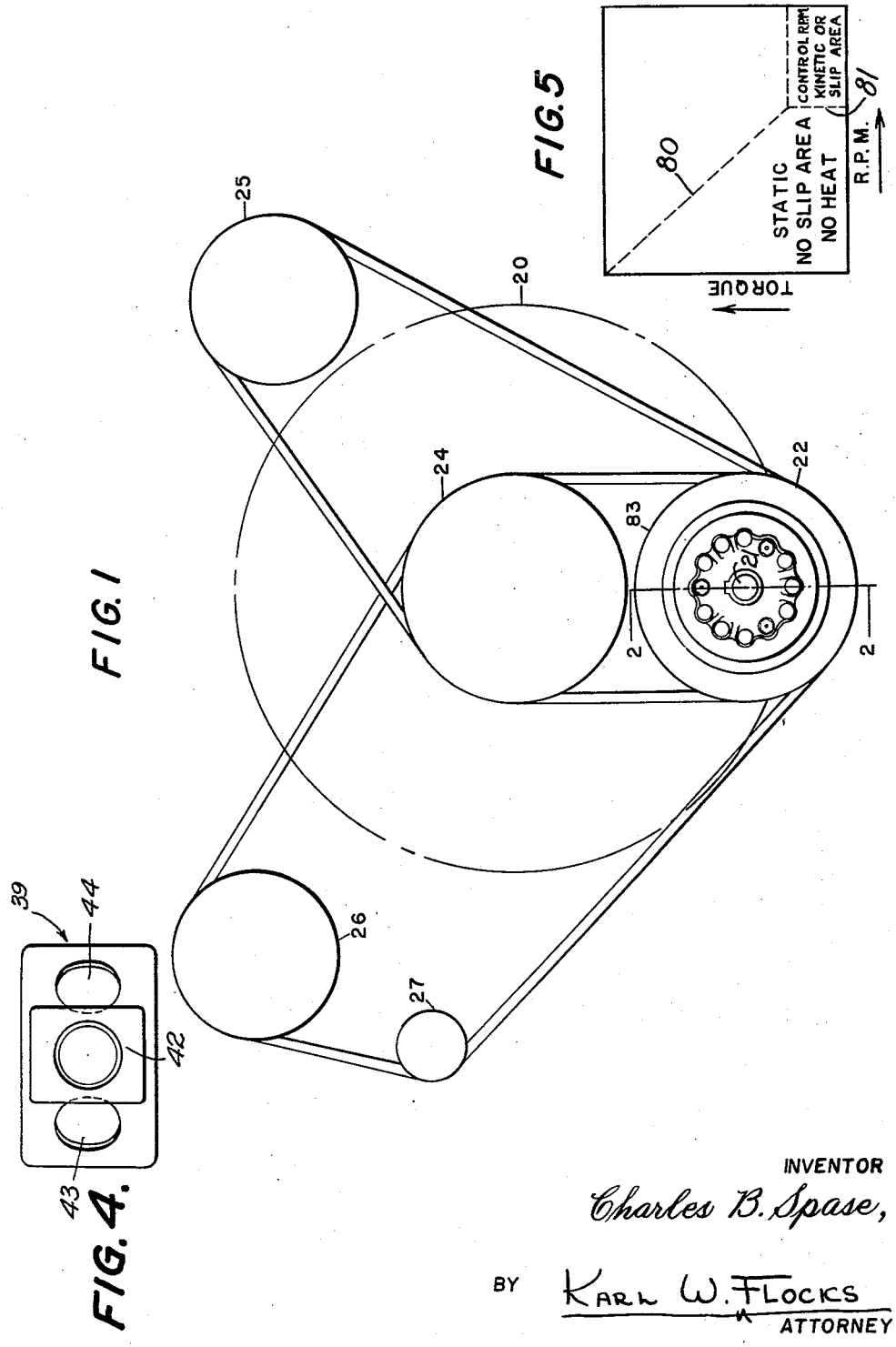

2,924,083

SPEED TORQUE METERING ARRANGEMENT WITH THERMAL CONTROL, THERMAL UNIT THEREFOR AND METHOD OF MAKING SAID UNIT

Charles B. Spase, Syracuse, N.Y., assignor to Lipe-Rollway Corporation, Syracuse, N.Y., a corporation of New York Application May 13, 1958, Serial No. 734,944

10 Claims. (Cl. 64—30)

The present invention relates to a speed torque metering arrangement with thermal control, and more particularly to such an arrangement in which a thermally actuated unit in a coupling device causes the device to transmit a greater amount of torque upon relative movement between the driven and driving members of the coupling unit.

The present invention also relates to a thermally responsive device that expands in one direction upon being heated and is strong enough to transmit forces at right angles to the direction of expansion.

The present invention further relates to a method of making the above noted thermally expansible unit that excludes air and other foreign matter from the space occupied by the thermally expansible material in the thermally responsive unit.

In present day automibile and other automotive equipment, it is common practice to use a gasoline driven internal combustion engine as the prime mover, or primary source of power. Conventionally, the automotive equipment is propelled by connection of the ground engaging wheels (or tracks) with the crank shaft of the engine at the rear of the engine; accessories are driven from the front of the crankshaft, and it is known to drive the accessories by one or more V belts trained over a sheave or sheaves connected to the crankshaft and other sheaves connected to the accessories. The word "accessories" includes, by way of example, the fan and water pump, an electric generator, an air compressor for air ride, etc. and a compressor for air conditioning, and a hydraulic pump for power steering and other hydraulically actuated devices.

It is known that these accessories must have good efficiency at low engine speed. Otherwise stated, it is necessary that they have a relatively high output at these low engine speeds. On the other hand, at high engine speeds these accessories must not have an exceedingly high speed of their own, since this would result in an excessively high rate of wear as well as create damgae due to the high centrifugal forces that come about at such speeds. This problem has been solved, in part, and suitably for certain installations, by providing for a speed reduction in the transmission of the rotary motion from the crankshaft to the accessory.

However, it is to be noted that as the driving part of the power transmission assembly increases in speed in a known type of coupling, there is a simultaneous decrease in torque transmission, that is in the delivered torque. While such an operation is satisfactory in certain installations, where there is an accessory that demands a high torque at high engine speed, the aforementioned coupling device has not been adequate. It may be seen that with the prior coupling device, it would be necessary to decrease engine speed in order to increase the delivered torque where the accessory demands more torque. An example of this is an automobile equipped with an air conditioner traveling at a high rate of speed in a hot climate. When the air conditioner is engaged with the prior coupling, the torque transmitted or delivered to the air conditioner compressor would be relatively low at high engine speeds, and thus the air conditioner would fail to absorb the B.t.u.'s necessary to cool the passenger compartment of the automobile.

In providing a coupling arrangement that overcomes the above discussed deficiencies, resort has been had to a thermally responsive device that operates in known manner by expanding when heated; however, the prior art thermal devices have in general either been complicated, expensive, had a low capacity for thermally expansible material in relation to the over-all dimensions of the device or were ont suitably rugged for use in such an installation as a mechanical coupling.

Where prior art processes of making thermally expansive units have required in general expensive molds and equipment capable of generating high pressures, there has here been provided a much simpler and much cheaper process for making the thermally expansible unit.

An object of the present invention is to provide a speed and torque metering arrangement that will limit the amount of torque delivered over a great range of input speed, and will also provide for increased torque at high speeds where necessary.

Another object of the present invention is the provision of a speed torque metering arrangement in which a mechanical coupling operates to decrease delivered torque as input speed increases over a given range, and that will deliver a higher torque where needed at high input speed.

Another object of the present invention is to provide a speed torque metering arrangement including a mechanical coupling in which a thermal control unit augments the control obtained with springs and friction shoes.

Yet another object of the present invention is the provision of a mechanical coupling that functions as a speed torque metering device and which is extremely simple in construction while being sufficiently rugged to withstand long, hard usage.

A further object of the present invention is to provide a thermally responsive device that will expand upon the application of heat and that is of extremely rugged construction.

Another object of the present invention is to provide a thermally expansive device that has large volume of thermally expansible material in comparison with the total volume of the device, and that is also of strong construction.

Yet another object of the present invention is to provide a thermally expansible device that is capable of transmitting forces in one direction by thermal expansion of the material contained therein, and also of transmitting forces acting in planes perpendicularly to the direction of the force produced by the thermally expansible material.

Yet another object of the present invention is to provide a thermally expansible device that will exclude all foreign matter and at the same time be of extremely simple and rugged construction.

It is another object of the present invention to provide a process for making a thermally expansible device that is relatively simple.

Another object of the present invention is the provision of a process for making a thermally expansible device that does not require the manufacture of molds or the use of equipment that is capable of exerting high pressures.

A further object of the present invention is to provide a method of making a thermally expansible device that will positively exclude the introduction of air or other foreign matter into the chamber that contains the thermally expansible material during the manufacture of the device.

Other objects and the nature and advantages of the instant invention will be apparent from the following description taken in conjunction with the accompanying drawings, wherein:

Fig. 1 is a front elevational view, partly schematic, of a gasoline engine, and accessories driven therefrom, in accordance with the present invention.

Fig. 2 is a sectional view of a mechanical coupling made in accordance with the present invention, and taken on the line 2—2 of Fig. 1.

Fig. 3 is an elevational view of the mechanical coupling of Fig. 2, with parts broken away in section.

Fig. 4 is a view of part of a coupling shown in Fig. 3, to an enlarged scale.

Fig. 5 is a chart showing the operating characteristics of a speed torque metering arrangement in accordance with the present invention.

Figure 6:
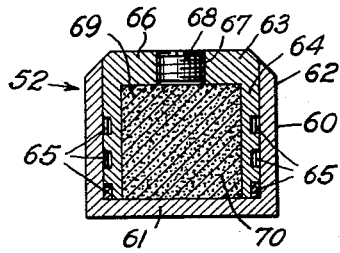
Fig. 6 is a longitudinal cross-sectional view of a thermally responsive device made in accordance with the present invention.

Referring now to the drawings wherein like reference characters are used to designate like or corresponding parts throughout the several views, there is shown in Fig. 1 a prime mover, preferably an internal combustion gasoline operated engine 20 having an output shaft 21 to which is secured a speed torque metering mechanical coupling 22, coupling 22 having a driven sheave 23. In proximity to the engine 20 in known fashion are a plurality of accessories, these accessories and their respective sheaves being illustrated at 24, 25, 26 and 27. In a typical installation, 24 is the fan and water pump, and the pulley or sheave therefor; 25 designates a power steering hydraulic pump, an air compressor for a suspension system, and the pulley or sheave therefor; 26 represents the pulley or sheave and compressor of a refrigerator or air conditioning unit; 27 represents the generator and pulley or sheave therefor. As may be seen in Fig. 1, V-belts or other similar devices connect the various sheaves to effect transmission of torque from the sheave of coupling 22 to the sheaves of the torque absorbing accessories.

Referring now to Figs. 2, 3, and 4 there may be seen in Fig. 2 the engine 20 and the torque output shaft 21 at the front thereof. Connected to shaft 21, as by a key 31 is the mechanical coupling 22 and comprising a flanged sleeve 32 that has secured to it a driving drum 33. Driving drum 33 is secured to the sleeve 32 by the bolts 34, or other suitable means. Also secured to the sleeve 32 is a harmonic balancer assembly 35, the details of which form no part of the present invention.

As may be seen, the driving drum 33 has an upstanding flange 36 at the front end thereof, and an annular plate and heat pump 37 at the back thereof, the flange 36 and plate 37 serving to form retaining surfaces for shoes 39, one of which is shown in Fig. 3.

Each shoe 39 comprises an arcuate shaped backing member 41 formed on its convex side with an upstanding portion 42 having a cylindrical recess or cavity therein, this recess or cavity being centrally of the shoe 39 both longitudinally and transversely. On either end of the shoe 39 and flanking the cavity formed by the portion 42 are a pair of spring receiving recesses 43 and 44. In spaced concentric relation with the driving drum 33 and outwardly of the shoes 39 is a cage comprising the annular members 46 and 47, the inner member 46 having a plurality of holes 48 therein to receive the outer ends of a thermal unit 52 in the cavity of upstanding portion 42, a spring 53 in the cavity 43 and a spring 54 in the cavity 44. As may be seen in Fig. 2, the members 46 and 47 of the cage are connected with the driven sheave 23, which in the present embodiment of the invention has three grooves thereon to receive three V-belts.

In operation, when the torque output shaft 21 of the engine 20 rotates, the driving drum 33 is caused to rotate therewith. At low speeds and at normal temperatures, the springs 53 and 54 will yieldingly urge the friction material 45 of the shoe 39 into engagement with the surface of driving drum 33. Rotary motion of the shoe 39 is transmitted to the members 46 and 47 of the cage by the springs 53 and 54 and the thermal unit 52. Because of the connection of the cage 46, 47 to the sheave or pulley 23, it will be caused to rotate also and to in turn rotate the sheaves or pulleys of the various accessories shown in Fig. 1, through the medium of the V-belts. As the speed of the shaft 21 and driving drum 33 increases, the centrifugal forces developing in the brake shoes will resist the urging of the springs 53 and 54, so that less pressure is obtained between the friction material 45 and the surface of the driving drum 33. Accordingly, there will be a decrease in the amount of torque transmitted at these increased speeds of crankshaft 21.

Referring to Fig. 5, this has been diagrammatically illustrated in a situation that takes into account the driving of a compressor for an air conditioning unit.

In Fig. 5, there may be seen the speed-torque metering curve 80 which may be seen to indicate a decrease in delivered torque to the compressor upon an increase in engine speed and compressor speed. In the area to the left of the vertical line 81 there is no relative movement between the cage and the driving drum 33; consequently, there is no slip between the surface of driving drum 33 and friction material 45 and no generation of heat. If the engine speed increases so that it is on the right hand side of the line 81, there will be slippage and a consequent generation of heat. This will cause the thermally responsive device 52 to become heated and expand and as a consequence thereof exert a force on the shoe 39. This will in turn decrease the amount of slippage and a greater torque will be able to be transmitted by the coupling 22. In the example chosen for illustration, the torque delivered will remain within the area to the right of the line 81 and will enable the coupling 22 to deliver a controlled amount of torque. Thus, at high engine speed and consequently at high speed of the automobile, sufficient amount of torque is able to be delivered by coupling 22 to supply the pulley of the compressor of the air conditioning unit at a safe maximum speed.

The thermal unit 52, shown in Fig. 6, consists of an outer capsule member 60 that is cup-shaped and has end wall 61 and an open-ended skirt 62 extending therefrom. Telescopically received within the skirt 62 of the capsule member 60 is a plug member 63 having a skirt 64, the skirt 64 having a plurality of circumferentially extending grooves 65 on the exterior periphery thereof. Plug member 63, which is also cup-shaped, has an end wall 66 having a threaded hole 67 therein, and a plug 68 in said hole 67.

The end wall 66 of plug member 63, the end wall 61 of capsule 60, and the interior of the skirt 64 of plug member 63 form a chamber 69 in which there is positioned the thermally expansible material 70. This material is preferably solid at ordinary temperatures, or room temperatures but becomes liquid at approximately 300° F., and upon further heating of the material 70 above 300° F., the material 70 will expand. Such materials are well known in the art, and the specific material used forms no part of the present invention.

In operation, the thermally responsive unit 52 will transmit rotary forces from the shoe 39 to the cage, and due to the rugged construction of it, it will hold up through a long period of rough usage. When the thermally responsive device 52 is heated to a temperature of approximately 300° F., the material 70 therein will liquefy, and upon further heating will expand; this will serve to drive the plug member 63 outwardly of the capsule 60, and to expand the skirt 64 outwardly into tight engagement with skirt 62, to exclude dirt or air from chamber 69.

As may be seen, this construction provides for a relatively large amount of thermally responsive material 70 in a given volume of the thermally responsive device 52, so that the volume of the material 70 is relatively large compared to the over-all dimensions of the device 52.

Figure 7:
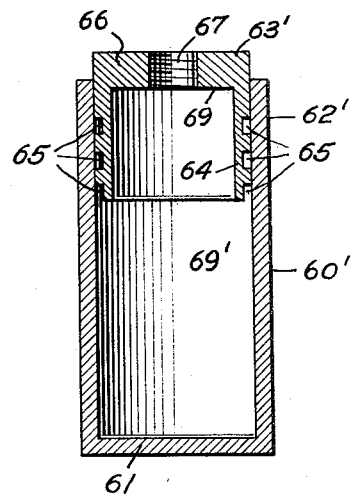
Fig. 7 is a longitudinal cross-sectional view showing a step in the process of making the device of Fig. 6.
Figure 8:
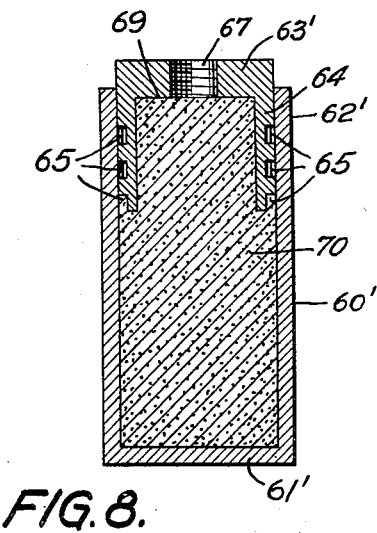
Figs. 8, 9 and 10 illustrate successive steps in the manufacture of the device of Fig. 6.

A preferred method of manufacture is as follows: Referring to Fig. 7, there may be seen a pair of cup-like members 60' and the cup-like member 63' having the grooves 65 on the periphery of the skirt 64 thereof. Member 63' has an end wall 66 that is oppositely disposed to an end wall 61 of the member 60'. The skirt 64 of member 63' is telescoped within and is relatively shorter than the skirt 62' of the memebr 60'. The end wall 66 has a threaded hole 67 therein. As may be seen, a relatively large chamber 69' is formed between the end walls and the skirts of the members 60' and 63'.

Having thus assembled the above described parts, the material 70 is poured into the chamber 69' through the hole 67, this operation taking place with both the cup-shaped member 60' and the cup-shaped member 63' and the material 70 at approximately 70° F. It will be recalled that at this temperature the material 70 is a solid, preferably a crystal granulate.

Figure 9:
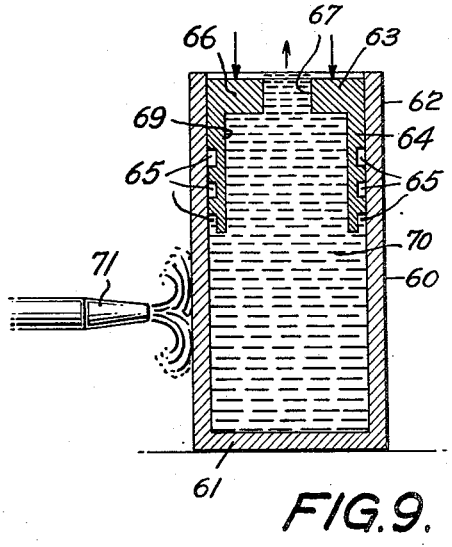

The parts as thus assembled, and with the chamber 69' filled with the material 70, are then heated by any convenient means, a burner 71 being shown for this purpose in Fig. 9. This serves to liquefy the material 70 as shown in Fig. 9. Note that the hole 67 is uppermost during this heating operation.

Thereafter, the cup-shaped member 63' is telescoped within the skirt 62' of the cup-shaped member 60' until the skirt 64 thereof bottoms on the end wall 61 of the cup-shaped member 60'; this action extrudes the liquid material 70 upwardly through the hole 67 in the end wall 66 of cup-shaped member 63'.

While at the elevated temperature, a flush screw or plug 68 is placed in the hole 67, and it may thus be seen that the unit has been sealed without any air in the unit and without any foreign material getting into the chamber that is occupied by the material 70; the unit is then cooled.

Figure 10:
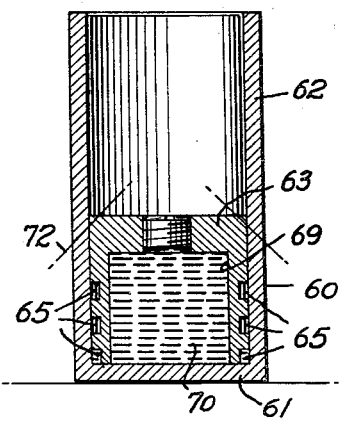

The members 60' and 63' are then cut along the plane 72 shown in Fig. 10, this of course removing that part of the skirt 62' of cup-shaped member 60' that extends beyond the end wall 66 of the member 63'. This cutting action also places a champered edge on the member 63' so that it is in fact now the member 63 of the completed unit.

It will be understood that the cup-shaped members are cylindrical, and preferably that they are of a circular cylindrical form, although other shapes are possible.

It will be understood that there has been provided a speed torque metering arrangement that is capable of delivering relatively large torques at high speed, thus to supply the necessary amount of torque to torque absorbing accessories while the prime mover of the system is being operated at a relatively high speed.

This has been accomplished in a simple, rugged, and relatively inexpensive construction, reliance being had upon a thermally responsive device that automatically expands upon an increase in slippage and consequently elevated temperature of the coupling to more firmly engage a friction shoe of a driven member to thus reduce the amount of slippage and thereby increase the torque delivered.

There has also been provided an extremely simple and rugged thermally responsive unit that has a high ratio of thermally responsive material to the over-all dimensions of the unit. In addition, there has been provided a simple and efficient method of manufacturing the thermal unit that can be accomplished with a minimum of equipment and requires no forms nor high capacity presses.

It will be obvious to those skilled in the art that various changes may be made without departing from the spirit of the invention and therefore the invention is not limited to what is shown in the drawings and described in the specification but only as indicated in the appended claims.

What is claimed is:

1. In combination, a prime mover having a torque output shaft, a plurality of torque absorbing accessories having sheaves and torque transmission means connecting said shaft and said accessories, said means including a mechanical coupling on said shaft having a driven sheave, and V-belts connecting the sheaves of said mechanical coupling with the sheaves of said accessories, said mechanical coupling comprising a driving drum fixedly connected to said shaft, a cage member of greater diameter than said driving drum in spaced concentric relation therewith and connected to said driven sheave, shoes between said drum and said cage member, coil compression springs acting against said shoes and said cage member and urging said shoes into contact with said drum, and thermally responsive means between said cage member and said shoes for exerting force on said shoes for urging said shoes into tighter contact with said drum upon heating of said shoes, and thermally responsive means, whereby upon an increase of load of one or more of said accessories and consequent slipping of said shoes on said driving drum, said thermally responsive means will be heated and will cause said shoes to more tightly engage said driving drum to cause said mechanical coupling to transmit greater torque to said accessories, said thermally responsive means comprising a device having an outer capsule member having an end wall and an open-ended skirt extending therefrom, a plug member having a skirt telescopically within the skirt of the capsule member and an end wall closing off the skirt at one end, said skirt of said plug member having a plurality of circumferentially extending recesses on the exterior thereof, the end wall of the plug member being in juxtaposition with the open end of the skirt of the capsule, and a thermally expansible material between said end walls and within said skirt of said plug member.

2. In combination, a prime mover having a torque output shaft, a plurality of torque absorbing accessories having sheaves and torque transmission means connecting said shaft and said accessories, said means including a mechanical coupling on said shaft having a driven sheave, and V-belts connecting the sheaves of said mechanical coupling with the sheaves of said accessories, said mechanical coupling comprising a driving drum fixedly connected to said shaft, a cage member of greater diameter than said driving drum in spaced concentric relation therewith and connected to said driven sheave, shoes between said drum and said cage member, springs acting against said shoes and said cage member and urging said shoes into contact with said drum, and thermally responsive means between said cage member and said shoes for exerting force on said shoes for urging said shoes into tighter contact with said drum upon heating of said shoes and said thermally responsive means, whereby upon an increase of load of one or more of said accessories and consequent slipping of said shoes on said driving drum, said thermally responsive means will be heated and will cause said shoes to more tightly engage said driving drum to cause said mechanical coupling to transmit greater torque to said accessories, said thermally responsive means comprising a pair of opposed telescopically engaged cup-shaped members having a cavity therein and a thermally expansible material in said cavity.

3. In combination, a prime mover having a torque output shaft, a plurality of torque absorbing accessories having sheaves and torque transmission means connecting said shaft and said accessories, said means including a mechanical coupling on said shaft having a driven sheave, and V-belts connecting the sheaves of said mechanical coupling with the sheaves of said accessories, said mechanical coupling comprising a driving drum fixedly connected to said shaft, a cage member of greater diameter than said driving drum in spaced concentric relation therewith and connected to said driven sheave, shoes between said drum and said cage member, springs acting against said shoes and said cage member and urging said shoes into contact with said drum, and thermally responsive means also between said cage member and said shoes for exerting force on said shoes for urging said shoes into tighter contact with said drum upon heating of said shoes and said thermally responsive means, whereby upon an increase of load of one or more of said accessories and consequent slipping of said shoes on said driving drum, said thermally responsive means will be heated and will cause said shoes to more tightly engage said driving drum to cause said mechanical coupling to transmit greater torque to said accessories.

4. In combination, a mechanical coupling comprising a driving drum, a cage member of greater diameter than said driving drum in spaced concentric relation therewith, shoes between said drum and said cage member, coil compression springs acting against said shoes and said cage member and urging said shoes into contact with said drum, and thermally responsive means between said cage member and said shoes for exerting force on said shoes for urging said shoes into tighter contact with said drum upon heating of said shoes and thermally responsive means whereby upon an increase of load on said coupling and consequent slipping of said shoes on said driving drum, said thermally responsive means will be heated and will cause said shoes to more tightly engage said driving drum to cause said mechanical coupling to transmit greater torque, said thermally responsive means comprising a device having an outer capsule member having an end wall and open-ended skirt extending therefrom, a plug member having a skirt telescopically within the skirt of the capsule member and an end wall closing off the skirt at one end, said skirt of said plug member having a plurality of circumferentially extending recesses on the exterior thereof, the end wall of the plug member being in juxtaposition with the open end of the skirt of the capsule, and a thermally expansible material between said end walls and within said skirt of said plug member.

5. In combination, a mechanical coupling comprising a driving drum, a cage member of greater diameter than said driving drum in spaced concentric relation therewith, shoes between said drum and said cage member, springs acting against said shoes and said cage member and urging said shoes into contact with said drum, and thermally responsive means between said cage member and said shoes for exerting force on said shoes for urging said shoes into tighter contact with said drum upon heating of said shoes and thermally responsive means, whereby upon an increase of load on said coupling and consequent slipping of said shoes on said driving drum, said thermally responsive means will be heated and will cause said shoes to more tightly engage said driving drum to cause said mechanical coupling to transmit greater torque, said thermally responsive means comprising a pair of opposed telescopically engaged cup-shaped members having a cavity therein and a thermally expansible material in said cavity.

6. In combination, a mechanical coupling comprising a driving drum, a cage member of greater diameter than said driving drum in spaced concentric relation therewith, shoes between said drum and said cage member, springs acting against said shoes and said cage member and urging said shoes into contact with said drum, and thermally responsive means between said cage member and said shoes for exerting force on said shoes for urging said shoes into tighter contact with said drum upon heating of said shoes and thermally responsive means whereby upon an increase of load on said coupling and consequent slipping of said shoes on said driving drum, said thermally responsive means will be heated and will cause said shoes to more tightly engage said driving drum to cause said mechanical coupling to transmit greater torque.

7. A mechanical coupling comprising a driving drum, a cage member of greater diameter than said driving drum in spaced concentric relation therewith, shoes between said drum and said cage member, and means between said shoes and said cage member to cause said coupling to transmit torque in inverse relation to the speed of the driving drum up to a predetermined speed thereof and to transmit a constant torque at speeds higher than said predetermined speed upon demand.

8. In combination, means to generate torque, means to absorb torque and means coupling said generating and absorbing means for transmitting torque in inverse relation to the speed of said torque generating means up to a predetermined speed, and to transmit constant torque at speeds higher than said predetermined speeds upon demand therefor by said torque absorbing means.

9. A mechanical coupling comprising a driving drum, a cage member, shoes irrotationally connected with said cage member and positioned to engage the surface of said drum, spring means urging said shoes into contact with said drum, and thermally responsive means for exerting force on said shoes for urging said shoes into tighter contact with said drum upon heating of said shoes and said means.

10. A mechanical coupling comprising a driving drum, a cage member of greater diameter than said driving drum in spaced concentric relation therewith and having spaced recesses therein, shoes between said drum and said cage member, coil compression springs each having one end engaging with said shoes and the other end in a recess in said cage member and urging said shoes into contact with said drum, and thermally responsive means having an end engaging said drum and another end in a recess in said cage member for exerting force on said shoes for urging said shoes into tighter contact with said drum upon heating of said shoes and said means, whereby upon an increase of load on said coupling and consequent slipping of said shoes on said driving drum, said thermally responsive means will be heated and will cause said shoes to more tightly engage said driving drum to cause said mechanical coupling to transmit greater torque.

References Cited in the file of this patent

UNITED STATES PATENTS

| | | |
|---|---|---|
| 1,872,986 | Lane | Aug. 23, 1932 |
| 2,087,438 | Stanley | July 20, 1937 |
| 2,507,466 | De Craene | May 9, 1950 |
| 2,657,852 | Spase | Nov. 3, 1953 |
| 2,759,254 | Soehnlen et al. | Aug. 21, 1956 |
| 2,807,246 | Jacobs | Sept. 24, 1957 |
| 2,810,290 | Schherer | Oct. 22, 1957 |

FOREIGN PATENTS

| | | |
|---|---|---|
| 1,114,899 | France | Apr. 17, 1958 |